Patented Feb. 24, 1942

2,274,358

UNITED STATES PATENT OFFICE 2,274,358

PRODUCTION OF BUTADIENE

Adolf Cantzler and Hans Krekeler, Mannheim, Germany, assignors to Jasco Incorporated, a corporation of Louisiana No Drawing. Application December 9, 1939, Serial No. 308,433. In Germany October 25, 1938

3 Claims. (Cl. 260—680)

The present invention relates to the production of butadiene.

In the preparation of butadiene by heating butylene to temperatures above 500° C. it has been observed that undesirable by-products are formed by the decomposition or polymerization of the butylene or butadiene. By mixing nitrogen or carbon dioxide with the butylene, these side reactions can be suppressed to a certain extent, but when working for long periods they are still always very troublesome.

We have now found that the production of butadiene by heating butylene to high temperatures proceeds in a specially favorable manner, in particular without the formation of appreciable amounts of by-products, by exposing butylene to high temperatures in the presence of hydrogen halide, preferably of hydrogen chloride. In contrast to other diluent gases, the hydrogen halide in particular suppresses the injurious and troublesome polymerization of the butadiene formed in the reaction vessel.

The reaction is preferably effected by leading a mixture of butylene and hydrogen halide, advantageously hydrogen chloride, through empty vessels, in particular tubes. Since the reaction is endothermic, it is preferable to use metallic reaction vessels, as for example tubes of cast steel, in order to be able to supply the amount of heat necessary for the reaction. The reaction temperatures lie above 500° C., generally between about 550° and 680° C., but below the temperature at which appreciable decomposition with the splitting up of the carbon chain takes place. The speed of flow may be chosen as desired. At high temperatures it is possible to work with a high speed of flow. An incomplete dehydrogenation may be taken into account because the unchanged butylene may be used again for the reaction. Generally speaking between 1 and 10 parts by weight of hydrogen halide are added to 1 part of butylene.

The conversion to butadiene may be still further improved by binding the hydrogen formed during the dehydrogenation wholly or partly by the addition of halogen, in particular chlorine, to the reaction zone with the formation of hydrogen halide. In this way a reaction mixture is obtained in the working up of which to butadiene it is not necessary to free it from the hydrogen formed during the dehydrogenation or it is necessary only to free it from part of the same.

The chlorine serving to bind the hydrogen is added to the reaction mixture at a point where hydrogen is already split off; the chlorine, if desired in admixture with hydrogen chloride, is therefore led into the reaction zone itself. The amount of chlorine should not be greater than is necessary for the binding of the hydrogen split off; this depends on the conversion of the butylene to butadiene and may be of different size depending on the reaction conditions. For example the supply of chlorine may be slowly increased, the decrease in hydrogen in the final gas being observed. When there is practically no further hydrogen in the final gas, the optimum for the addition of chlorine has been reached; if the addition of chlorine be increased beyond this point, undesirable byproducts are formed. A smaller amount of chlorine may also be added in which case a part of the hydrogen is contained in the reaction mixture in free form.

The reaction gas may be worked up very simply, for example by first removing the hydrogen chloride by treatment with aqueous, as for example 20 per cent, hydrochloric acid, then separating the residual mixture of butylene and butadiene and again dehydrogenating the butylene according to the present invention. The hydrogen chloride absorbed by the washing hydrochloric acid may be expelled again by simple heating and then used again as diluent gas.

The following examples will further illustrate how the said invention may be carried out in practice but the invention is not restricted to these examples.

Example 1

The vapors of 230 grams of normal butylene mixed with 470 grams of dry hydrogen chloride are led per hour through a cast steel tube 1 metre long and 45 millimetres in internal width which is heated to 625° C. The gas leaving the tube is washed with 20 per cent aqueous hydrochloric acid at ordinary temperature and thereby freed from hydrogen chloride. The residual gas is cooled to 80° below zero C., whereby 197 grams of a liquid are obtained which consists of 79 grams of butadiene and 118 grams of butylene.

The reaction may be carried on continuously in the same tube for a long time without trouble.

Example 2

The vapors of 120 grams of butylene mixed with 1400 grams of hydrogen chloride are led per hour through an empty cast steel tube 1 metre long and 45 millimetres in internal width which is heated to 650° C. Into the hot zone of the tube there are led through a narrower tube ending in the centre of the tube 135 grams of chlorine gas per hour. The gas leaving the reaction tube is washed in a tower with 20 per cent hydrochloric acid and thus freed from hydrogen chloride. There are thus separated 1540 grams of hydrogen chloride per hour. The residual gas is cooled to 80° below zero C. whereby 92 grams of condensate are obtained consisting to the extent of 78 per cent of butadiene.

What we claim is:

1. A process for the production of butadiene which consists in exposing 1 part by weight of butylene to temperatures exceeding 500° C. in the presence of at least 1 part by weight of hydrogen halide.

2. A process for the production of butadiene which consists in exposing 1 part by weight of butylene to temperatures exceeding 500° C. in the presence of at least 1 part by weight of hydrogen chloride.

3. A process for the production of butadiene which consists in exposing 1 part by weight of butylene to temperatures exceeding 500° C. in the presence of at least 1 part by weight of hydrogen chloride and continuously combining at least part of the hydrogen evolved with chlorine.

ADOLF CANTZLER.
HANS KREKELER.